Figure 2:
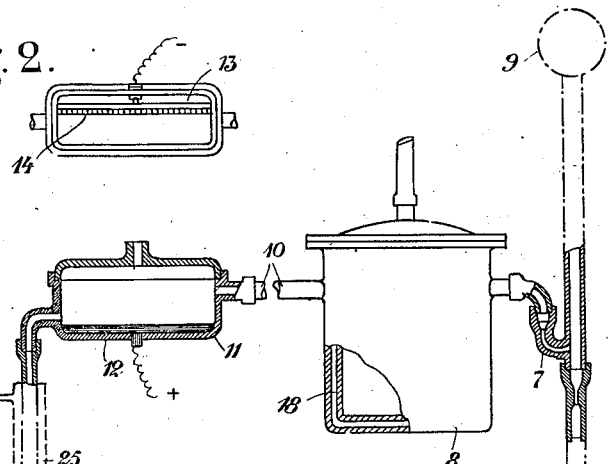

July 15, 1924.

E. G. THORIN

METHOD OF MANUFACTURING ACETALDEHYDE FROM ACETYLENE

Filed Dec. 3, 1920

1,501,502

Inventor
E. G. Thorin.
By H. R. Kerslake
Atty.

Patented July 15, 1924.

1,501,502

UNITED STATES PATENT OFFICE.

ERIK GUSTAF THORIN, OF MANSBO, AVESTA, SWEDEN, ASSIGNOR TO STOCKHOLMS SUPERFOSFAT FABRIKS AKTIEBOLAG, OF STOCKHOLM, SWEDEN.

METHOD OF MANUFACTURING ACETALDEHYDE FROM ACETYLENE.

Application filed December 3, 1920. Serial No. 428,067.

*To all whom it may concern:*

Be it known that I, ERIK GUSTAF THORIN, subject of the King of Sweden, and residing at Mansbo, Avesta, in the Kingdom of Sweden, have invented certain new and useful Improvements in Methods of Manufacturing Acetaldehyde from Acetylene, of which the following is a specification.

In the manufacture of acetaldehyde from acetylene with the aid of mercury salt solutions containing excess of sulphuric acid the speed of reaction is, as is well known, very soon diminished and finally the reaction will completely cease due to the mercury catalyst being reduced to metallic mercury in the form of either a finely divided mud or a coherent regulus dependent on the concentration of the sulphuric acid. It is also previously known that the reaction can be started again by the addition of a fresh quantity of mercury salt or of an oxidizing agent by the action of which the mercury mud is converted into active form. The process can, in this way no doubt be prolonged, but the liquid in which the reaction proceeds—called reaction liquid—will relatively soon be made impure by the mud or by the oxidizing agents added.

In order to avoid these inconveniences it has been proposed to produce within the reaction chamber, the solution of mercury salts necessary for the reaction, by the oxidizing action of an electric current on the mercury contained in the reaction chamber— anodic dissolving of the mercury. For the continuous running of the process it is necessary that the mercury which has been precipitated by reduction can be caused to combine with the anodic mercury. It might be supposed that this could be attained by maintaining the concentration of the sulphuric acid somewhat lower than 6% of $SO_4$. However, experiments have proved that the concentration of the sulphuric acid must be held much lower and be less than 3% but one has not even in this case succeeded in causing the mercury mud to combine with the anodic mercury, wherefore the reaction apparatus is gradually filled with mud. This is probably due to the fact that a certain potential difference exists between the anodic mercury and the reaction liquid thus effecting other surface tensions, and, moreover, the mud particles become electrically charged and therefore repel one another. During the process some aldehyde-resin and other products of polymerization are always formed which are precipitated amongst the mud particles. If therefore the process has been running for a longer time the mud, aldehyde resins, and polymerization products must be wholly removed from the reaction apparatus and the latter recharged with a fresh solution. Not considering the fact that the method is for this reason lacking of continuity and that considerable losses of mercury are caused when the apparatus is cleaned, the hygienic risks are too great for making this method of working fit for practical use.

The above mentioned necessary low concentration of the sulphuric acid will considerably decrease the reaction speed so that the quantity of acetaldehyde which is produced, per unit of time and per unit of volume of the reaction liquid, will be too low for making the process economical. In any case the dimensions of the reaction apparatus would in this case be so big that they would be out of question.

By the anodic dissolving of the mercury within the reaction apparatus it may occur that, besides a certain quantity of mercury being dissolved, even some acetaldehyde dissolved in the reaction liquid is oxidized so as to form acetic acid which is in its turn oxidized to carbon oxides that are mixed with the circulating acetylene gas and make the same impure so that it must often be replaced by pure gas. Moreover, the hydrogen being precipitated on the cathode is sucked into the apparatus due to the vigorous agitation, and this hydrogen also will make the acetylene gas impure. The losses of acetylene caused by these reasons will in course of time be very expensive.

Moreover, it has been found that the fall of potential between the cathode and the anode can come up to several tens of volts. This is due to the fact that an insulating layer of aldehyde-resin or polymerization products of acetylene are precipitated on the cathode. A trial of applying a diaphragm has been completely unsuccessful since the diaphragm, due to precipitations on its surface, was made impermeable. Since a diaphragm cannot be used a portion of the mercury dissolved by anodic oxidation is precipitated on the cathode and is, thus, prevented from partaking in the reaction. It has also been found that the concentration of mercury in the liquid in which the reaction proceeds becomes considerably lower than it would be if a diaphragm could be used.

The hydrogen gas which is generated on the cathode is not pure but contains, as impurities, acetylene and aldehyde and hydrocarbons formed by the reduction of the aldehyde. The recovering of the same is not profitable.

The construction in a scale adapted for practical use of apparatuses for executing these known methods has raised great difficulties. Each such apparatus must be provided with a stirring device, inlet and outlet for acetylene, cathode and anode compartments and other necessary fittings. Since the apparatus which can hardly be made from other material than earthenware, must also be heated to the reaction temperature it ought to be obvious that it would be very difficult to manufacture the same especially as the same, due to the low speed of reaction, must be of extremely great dimensions.

The object of the present invention is to obtain a completely continuous method which makes it possible to manufacture a great quantity of acetaldehyde per hour and per litre of reaction liquid, with very small losses of acetylene, while at the same time no difficulties to the technical execution of the apparatus.

The characteristic feature of my invention now consists in this that the liquid in which the reaction proceeds is in a continuous or cyclic process taken out from the reaction chamber and is, while outside the latter, purified and enriched with mercury compounds by anodic oxidizing or dissolving of mercury whereupon it is again introduced into the reaction chamber. The anodic oxidation of mercury will thus take place in a special vessel which is separated from the reaction vessel and which does not communicate with the latter except through the liquid circulation conduit. In practice this method can be executed in such a manner that the reaction liquid is removed from the reaction chamber and is, outside said chamber, first exposed to a separation process so as to remove mercury mud, aldehyde-resin and other solid impurities, these operations being preferably executed in a so called up-current separator. Then the liquid is heated so as to expel the acetaldehyde and other volatile compounds which can be executed in any suitable manner, for instance in a vessel provided with a steam jacket, in a column apparatus or in any other suitable heating or distilling apparatus working with or without vacuum. Thereafter the liquid is introduced into an electrolyzer where the anodic oxidizing and dissolving of the mercury takes place and is then again introduced into the reaction chamber and so on in a cyclic process. One can of course also proceed in such a manner that the liquid is only purified from mud and products of polymerization and then electrolyzed without first removing the volatile constituents.

Figure 1:
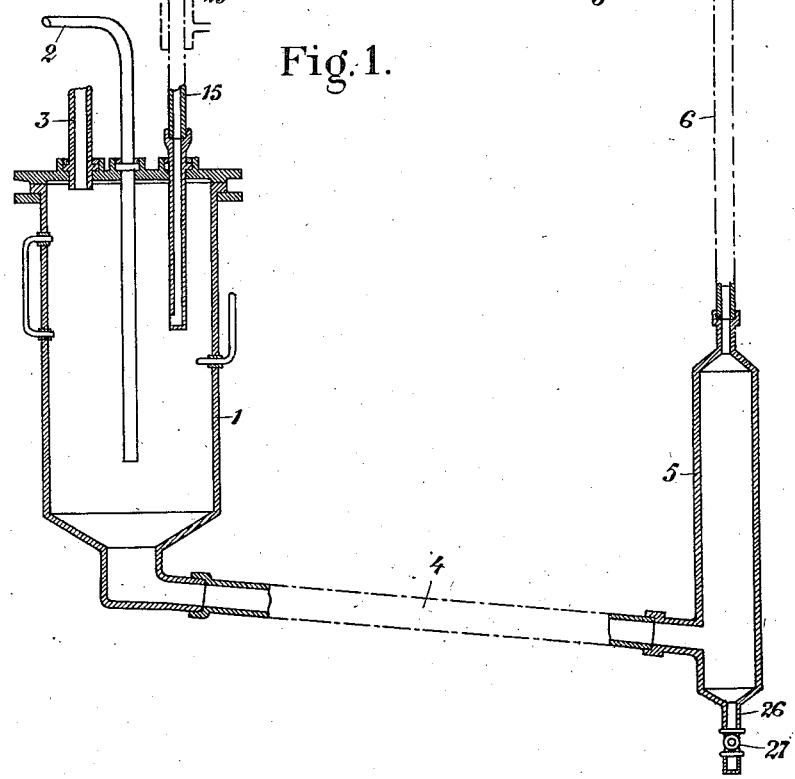

A system of apparatus adapted for executing the above method is schematically shown as an example on the accompanying drawing where Fig. 1 shows the system in elevation with the different parts of the apparatus wholly or partially in section. Fig. 2 is a plan view of the electrolyzer.

On the drawing 1 designates the reaction receptacle or chamber which is provided with a supply tube 2 for acetylene and an outlet tube 3 for any acetylene that has not been consumed, and for the acetaldehyde formed. Through the tube 4 leading from the lower end of the reaction vessel, the reaction chamber is in communication with an upright, wide tube 5—up-current separator—which through the conduits 6 and 7 is connected with a heating vessel 8 provided with a steam jacket 18 into which the liquid is forced by means of a pump 9—schematically shown—or other similar apparatus. Through conduit 10 the vessel 8 is connected with the electrolyzing apparatus 11, shown in plan view in Fig. 2 with the cover 21 removed. 12 is a mercury anode and 13 is the cathode which is made of lead or other suitable metal. Between 12 and 13 is located a diaphragm 14. Through the tube 15 which is suitably provided with a steam jacket 25—shown in dotted lines—the electrolyzer is connected with the reaction vessel 1.

The process is executed in the following manner:

In the reaction vessel 1 there is a hot aqueous solution of mercuric sulphate containing an excess of sulphuric acid. Even other acids than sulphuric acid may be used. A rapid current of acetylene is introduced into the vessel through conduit 2 and the excess of acetylene together with the acetaldehyde formed are led off through the tube 3. After the acetaldehyde has been separated the acetylene gas is again introduced into the reaction chamber, the quantity of acetylene having previously been consumed being replaced by fresh acetylene. The reaction liquid is, during the running of the process, continuously pumped out from the vessel 1 and introduced into the separator 5 where the mercury mud deposits after which the liquid is carried through conduits 6 and 7 into the vessel 8 where acetaldehyde is driven off by heating the liquid. The driving off of the acetaldehyde can, as stated above, be executed in any other suitable manner, for instance in a column apparatus, by vacuum distillation etc. From the heating apparatus 8 the liquid is introduced through the conduit 10 into the electrolyzer 11 where the liquid is enriched with mercury salts by anodic oxidation of mercury, whereupon the same in this pure condition is again introduced into the reaction vessel 1. The speed with which the circulation of the liquid ought to take place can of course be varied so that suitable quantities of mercury salts are continuously introduced into the reaction chamber and so that the output of aldehyde formed becomes as high as possible. The mercury mud which is taken out from the up-current separator through the conduit 26 provided with valve 27 can be converted into pure metallic mercury in several manners. The most simple manner ought to be the distillation of the same in the presence of calcium oxid or the centrifugation of the same, whereupon it is again introduced into the electrolyzer.

In order to diminish the formation of mud one can at the beginning of the operation add a small quantity of ferric compounds to the reaction liquid which in a known manner make the mud active. The ferric salts are reduced to ferrous salts but these are again in the electrolyzer continuously oxidized to ferric salts and need, consequently, not be renewed. It is also possible to add ferrous salts in the beginning. The formation of mud can also be diminished by suitably choosing the concentration of acid, the temperature and the speed of circulation. If also a suitable strength of current be chosen the formation of mud can be held very low, and the same will principally consist of aldehyde-resin and products of polymerization.

If the aldehyde is removed from the reaction liquid by vacuum distillation before said liquid is introduced into the electrolyzer the suitable reaction temperature is imparted to the liquid by means of the above mentioned steam jacketed conduit 15 between the electrolyzer and the reaction chamber. It has been found that the reaction temperature ought to be held lower than has hitherto been the case in corresponding methods where the aldehyde is removed from the reaction vessel solely by means of the circulating acetylene gas, and that by this means the speed of reaction will be considerably higher.

By the above described method and the apparatus shown following advantages are gained:

1. The reaction vessel, which can be made considerably smaller than hitherto, need not be heated since the heating of the reaction liquid is effected outside the same.

2. No stirring in the reaction chamber is required.

3. The reaction liquid can be held free from mercury mud, aldehyde-resin etc. and need not be renewed.

4. By removing the product of reaction in two manners, i. e. partly by the circulating acetylene gas and partly by the aldehyde being expelled from the reaction liquid before the latter is introduced into the electrolyzer, the aldehyde concentration is held very low at the place where the reaction proceeds. A low aldehyde concentration will namely cause a higher reaction speed and a lower formation of mud.

5. It will be possible to use a diaphragm in the electrolyzer since the reaction liquid introduced into the same is free from mercury mud, aldehyde-resin and polymerization products. The fall of potential will by this means only be some few volts.

6. A partial oxidation to acetic acid and carbon oxides of the acetaldehyde cannot take place when the reaction liquid is free from aldehyde. From this reason there will neither be any loss of current nor of aldehyde.

7. The hydrogen which is generated on the cathode has, due to its being pure, a certain value and can therefore be utilized.

8. The acetylene gas cannot be made impure neither by hydrogen nor by carbon oxides and need, consequently, not be renewed which is a profit since any loss of acetylene must be avoided for making the process economical.

9. Due to the fact that any formed mercury mud as well as aldehyde-resin are continuously removed the concentration of the sulphuric acid in the reaction liquid can be increased without running the risk that the simultaneously increased quantities of mercury mud and aldehyde-resin should have a hindering effect on the process.

10. It will be possible to maintain a lower temperature within the reaction chamber which is favourable for the process.

11. The method executed on a technical scale will offer considerable advantages over the previous methods. The dissolving of the mercury can namely be executed at a central place common to several reaction apparatuses and the total quantity of mercury mud from all the reaction apparatuses can be recovered at a single place.

12. The mercury mud can directly without losses be tapped into a distillation apparatus or other suitable arrangement for purifying mercury, whereupon it is introduced into the electrolyzer.

I claim:

1. Method of manufacturing acetaldehyde from acetylene by using a catalytically acting reaction liquid containing mercury compounds formed by anodic dissolving of metallic mercury in the reaction liquid, which comprises removing the reaction liquid in a cyclic process from the reaction chamber, and while outside said reaction chamber purifying it, and by anodic oxidation enriching the same with mercury compounds and then again introducing said liquid into the reaction chamber.

2. Method of manufacturing acetaldehyde from acetylene by using a catalytically acting reaction liquid containing mercury compounds formed by anodic dissolving of metallic mercury in the reaction liquid, which comprises removing the reaction liquid in a cyclic process from the reaction chamber, depriving the same outside the reaction chamber from solid impurities, exposing the same in this purified condition, likewise outside the reaction chamber, to anodic oxidation so as to enrich the same with mercury compounds, and re-introducing the same into the reaction chamber.

3. In the method of manufacturing acetaldehyde according to claim 1 the step of producing a cyclic current of the liquid from the reaction chamber, through a device in which mercury mud, aldehyde resin compounds, and other solid impurities are removed, then expelling the acetaldehyde and other volatile compounds from the liquid, then subjecting the purified liquid to anodic oxidation for enriching the same with mercury compounds, and then again introducing the liquid into the reaction chamber.

4. In the process of claim 1 the step of removing solid impurities from the liquid by passing the liquid upwardly as a slow current while allowing the impurities to settle therefrom.

5. In the process of claim 2 the step of maintaining the liquid during the circulation at a high temperature adapted for the conversion of acetylene into acetaldehyde, by heating the liquid before subjecting the same to the anodic oxidation treatment.

6. In the method of claim 2, the step of removing the volatile substances from the liquid by subjecting the same to a vacuum.

In testimony whereof I have affixed my signature in presence of two witnesses.

ERIK GUSTAF THORIN.

Witnesses:
  AXEL EHRNER,
  CARL BONDY.